United States Patent [19]
Hein et al.

[11] Patent Number: 5,172,894
[45] Date of Patent: Dec. 22, 1992

[54] DUAL ELASTOMERIC/FLUID ENGINE MOUNT

[75] Inventors: Richard D. Hein, Wabash; Bradley G. Hampton, Tipton; Donald L. Deane, Logansport, all of Ind.

[73] Assignee: GenCorp Inc., Fairlawn, Ohio

[21] Appl. No.: 802,580

[22] Filed: Dec. 5, 1991

[51] Int. Cl.$^5$ .................. F16F 13/00; B60G 7/04
[52] U.S. Cl. .................. 267/140.12; 267/219
[58] Field of Search ............ 267/140.1 L, 140.1 R, 267/281, 282, 219, 141.2, 141.6, 140.5, 35, 220, 158, 140.12, 140.11

[56] References Cited

U.S. PATENT DOCUMENTS

| | | | |
|---|---|---|---|
| 2,126,707 | 8/1938 | Schmidt | 267/140.5 |
| 2,621,923 | 12/1952 | Krotz | 267/281 |
| 3,013,808 | 12/1961 | Willetts | 267/282 |
| 4,621,830 | 11/1986 | Kanai | 267/282 |
| 4,840,357 | 6/1989 | Jouade | 267/219 X |
| 4,941,649 | 7/1990 | Funahashi et al. | 267/140.1 C |

FOREIGN PATENT DOCUMENTS

| | | | |
|---|---|---|---|
| 0172743 | 9/1985 | Japan | 267/140.1 C |
| 0206838 | 9/1986 | Japan | 267/140.1 C |
| 2037398 | 7/1980 | United Kingdom | 267/281 |

*Primary Examiner*—Matthew C. Graham

[57] ABSTRACT

An engine mount is described as having two concentrically disposed annular resilient rubber springs, the outermost of which is provided with a pair of cavities and connecting passageway for receiving a dampening fluid. The spring rates of the two rubber springs can be individually tuned by the use of voids or cavities. Thus, there is a threefold manner in which the spring rate of the engine mount can be tuned.

8 Claims, 1 Drawing Sheet

DUAL ELASTOMERIC/FLUID ENGINE MOUNT

BACKGROUND OF THE INVENTION

The invention relates to automobile engine mounts, especially those that utilize both hydraulic fluid and elastomeric material as a vibration cushioning medium.

U.S. Pat. No. 3,387,839 relates to a duplex-type bushing which has three successively larger metal sleeves between which are a pair of solid rubber inserts to provide the needed resiliency for the bushing which can be adapted to an engine mount.

U.S. Pat. Nos. 3,642,268 and 4,702,346 and 4,834,351 are typical of the many patents which rely on a single rubber insert with separated cavities between which fluid, such as ethylene glycol solution, is free to circulate.

U.S. Pat. No. 4,840,357 covers a very complex dual elastomeric structure which is composed of two elastomeric inserts which are not in radially spaced relation, but which employs a dampening liquid which is free to circulate between voids or cavities formed in and between the two inserts.

U.S. Pat. No. 4,768,760 utilizes two radially spaced elastomeric inserts with specially shaped fluid containing cavities which are formed in the radially outermost insert and connected by fluid passageways in the radially innermost insert. Thus, both inserts are effected by the dampening fluid. The invention is directed to an improved engine mount which employs a combination of elastomeric inserts and dampening fluid which is different from anything shown in the prior art.

Briefly stated, the invention is in an engine mount which essentially comprises three successively larger metal sleeves between which are a pair of resilient, annular elastomeric inserts of springs. The larger, radially outermost insert is provided with a pair of spaced cavities with at least one connecting passageway through which a dampening fluid can flow freely between the cavities.

The invention is designed to combine the most desirable vibration control features of the common fluid mount and the mount which employs two resilient elastomeric springs.

DESCRIPTION OF DRAWING

The following description of the invention will be better understood by having reference to the accompanying drawing, wherein.

DETAILED DESCRIPTION OF DRAWING

Figure 1:
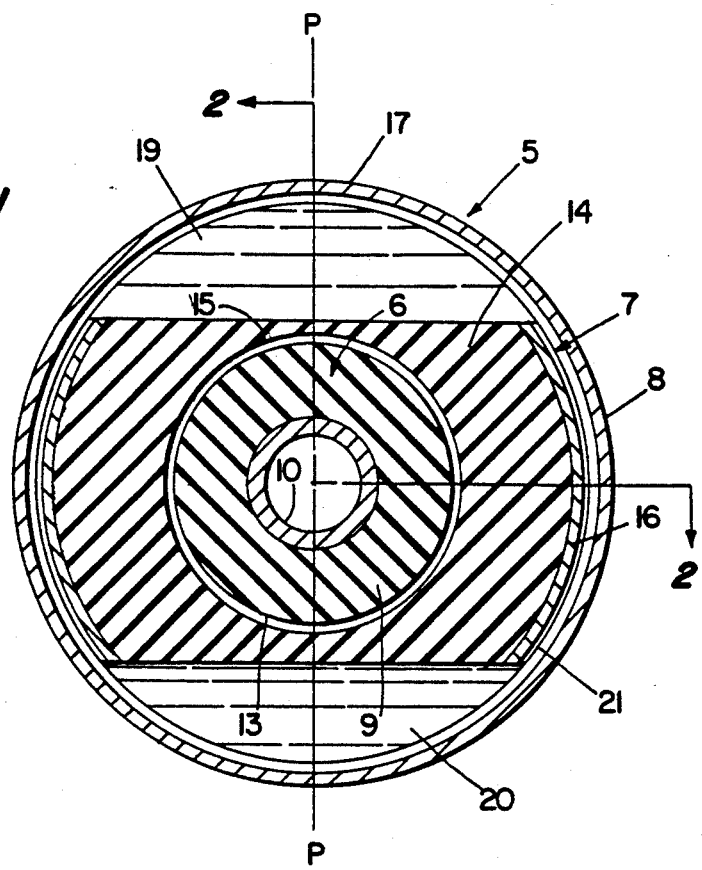
FIG. 1 is a section of an engine mount which is made in accordance with the invention and viewed from the line 1—1 of FIG. 2.
Figure 2:
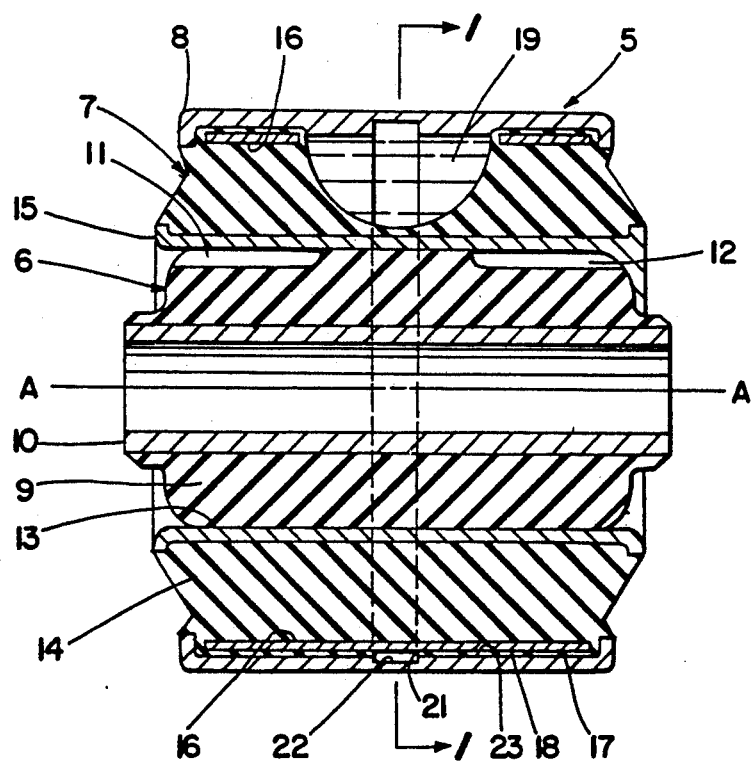
FIG. 2 is a section of the mount viewed from the line 2—2 of FIG. 1.

With reference to FIGS. 1 and 2, there is shown an automobile engine mount 5 which comprises an inner spring assembly 6 which is surrounded by an outer spring assembly 7, both of which are clamped together by an outer metal casing 8.

The inner spring assembly 6 comprises a first annular resilient spring 9 which is composed of any suitable elastomeric material, e.g. rubber, and which surrounds a cylindrical inner metal sleeve 10. The inner spring 9, as best seen in FIG. 2, is provided with a pair of voids or recesses 11, 12 in the outer surface 13 of the spring 9 above and below (not shown) the center axis A—A, i.e., 180 degrees apart, of the inner spring assembly 6. These voids 11, 12 are symmetrical about the center plane P—P (FIG. 1) of the engine mount 5 and are provided to tune the inner spring 9 to a particular desired spring rate.

The outer spring assembly 7 comprises a second annular resilient spring 14 which is, likewise, composed of any suitable elastomeric material, e.g. rubber, and which is disposed between an intermediate metal sleeve 15, relative to the engine mount 5, and an outer metal sleeve 16 which is preferably embedded in the second spring 14 adjacent the outer peripheral surface 17 to provide a thin, outermost strip 18 of elastomeric material for compressive sealing engagement with the surrounding outer metal casing 8. The second spring 14 is provided with a pair of opposing cavities 19, 20 which are 180 degrees apart and symmetrical about the center axis A—A, and which are designed to receive any suitable cushioning or dampening fluid, e.g. ethylene glycol solution. The two fluid cavities 19, 20 are connected by any suitable fluid passageways which are provided outside the inner spring assembly 6. For example, the thin outer strip 18 of elastomeric material can be provided with a circumferential groove 21 which connects the two fluid cavities 19, 20, or the outer metal casing 8 can be provided with a circumferential groove 22 along its inner peripheral surface 23 for connecting the two fluid cavities, or there can be a combination of both grooves 21, 22 in circumferential confronting alignment to insure that, as the elastomeric material expands under compression, the fluid passageways between the fluid cavities 19, 20 will not be blocked. It can be appreciated that the size and shape of the cavities can be varied to, likewise, tune the spring rate of the second spring.

The engine mount 5 was described as being cylindrical, although it can be of any suitable geometric shape, depending on the design parameters required to be met.

Thus, there has been described a unique engine mount which has two elastomeric springs, each of whose spring rates can be individually tuned by the use of different elastomeric materials in the inner and outer springs, or by the use of strategically located voids to produce a desired spring rate, in combination with a cushioning or dampening fluid. This combination produces an improved engine mount whose spring rate characteristics can be readily adapted to meet different design requirements.

What is claimed is:

1. An engine mount, comprising
   a) an inner spring assembly, including;
      (1) an inner hollow metal sleeve;
      (2) a first, resilient elastomeric spring surrounding the inner sleeve, the first spring having at least one pair of voids disposed therein, the voids being, (i) spaced 180 degrees apart, (ii) unconnected and free of any dampening fluid, and (iii) designed to provide the spring rate desired in the inner spring assembly; and
   b) an outer spring assembly coacting with the inner spring assembly to dampen vibrations, the outer spring assembly including;
      (3) an intermediate metal sleeve surrounding the first spring;
      (4) a second, resilient elastomeric spring surrounding the intermediate sleeve, the second spring including a pair of cavities which are disposed therein 180 degrees apart for receiving a dampening fluid, the radial orientation of the voids and cavities being in the same directions from the longitudinal axis of the inner sleeve;

(5) an outer metal sleeve embedded in the second spring adjacent the outer periphery thereof leaving a thin layer of elastomeric spring material outside the outer metal sleeve in farther spaced relation from the intermediate sleeve than the other sleeve; and c) an outer metal casing surrounding the outer metal sleeve in compressed relation with the thin layer of elastomeric material to hold the inner and outer spring assemblies in concentric relation;

d) at least one fluid passageway outside the inner spring assembly for connecting the pair of cavities in the second spring such that a dampening fluid can flow between the cavities; and e) a dampening fluid disposed in the cavities.

2. The engine mount of claim 1, wherein the plurality of voids of the first spring includes two pairs of voids disposed 180 degrees apart, each of the two pairs of voids including a pair of voids in side-by-side separated and unconnected relationship, each pair of voids being equally radially spaced from the longitudinal axis of the inner, hollow metal sleeve.

3. The engine mount of claim 1, wherein the fluid passageway includes a groove disposed in the thin layer of elastomeric material.

4. The engine mount of claim 1, wherein the fluid passageway includes a groove disposed in the inner periphery of the outer casing closest the second spring.

5. The engine mount of claim 1, wherein the fluid passageway includes confronting aligned grooves in the adjacent abutting peripheries of the outer casing and thin layer of elastomeric material.

6. The engine mount of claim 1, wherein the first and second springs are rubber and annular, in shape.

7. The engine mount of claim 1, wherein the vibration dampening fluid is composed essentially of ethylene glycol.

8. The engine mount of claim 1, wherein the outer metal sleeve, adjacent each of the cavities, has an opening corresponding to the adjacent cavity.

* * * * *